Oct. 14, 1924.　　　　　　　　　　　　　　　　　1,511,931
F. O. ANDERSON
SAFETY CATCH AND METHOD OF MAKING THE SAME
Filed June 28, 1922　　　3 Sheets-Sheet 1
Fig. 1.
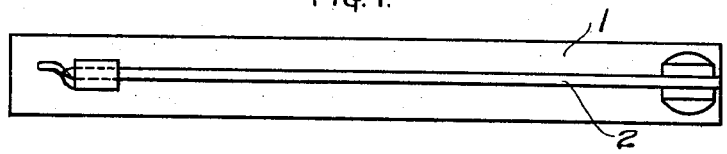
Fig. 2.
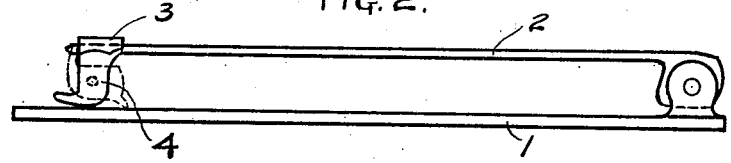
Fig. 3.
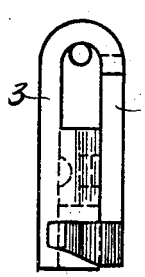
Fig. 4.　　Fig. 5.
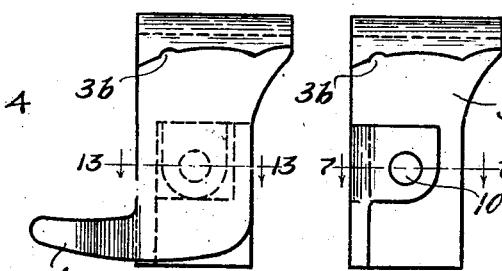
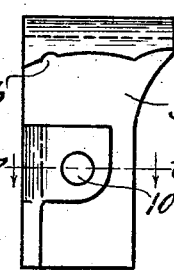
Fig. 6.
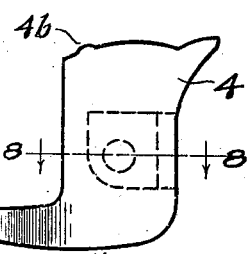
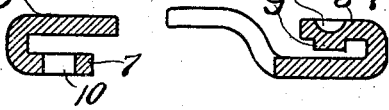
Fig. 7.　　Fig. 8.
Fig. 9.
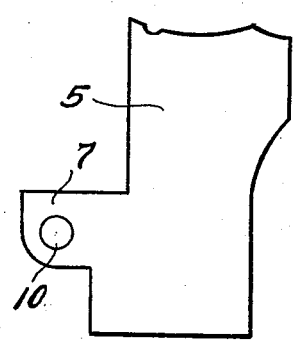
Fig. 11.
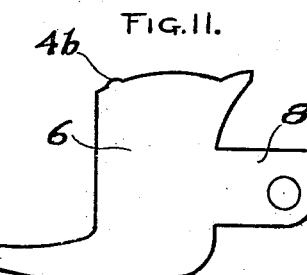
Fig. 13.
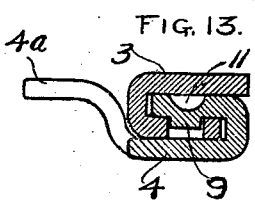
Fig. 10.　　Fig. 12.
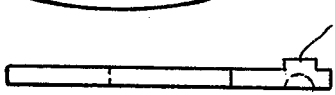
INVENTOR
FRANK O. ANDERSON
BY HIS ATTORNEY
James F. Williamson Oct. 14, 1924.                                          1,511,931
F. O. ANDERSON
SAFETY CATCH AND METHOD OF MAKING THE SAME
Filed June 28, 1922          3 Sheets-Sheet 2
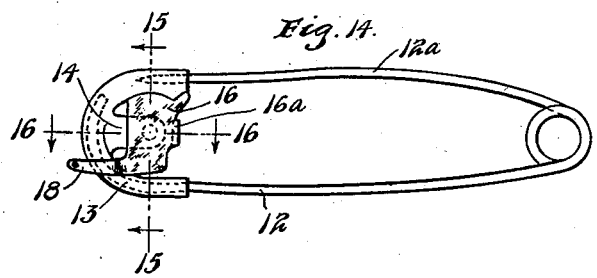
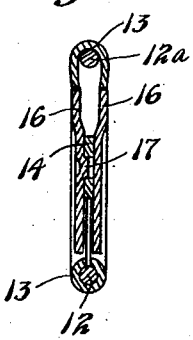
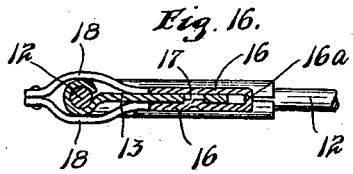
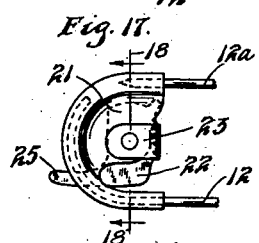
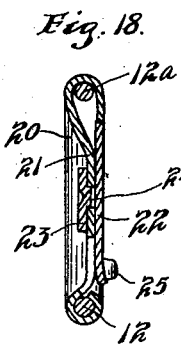
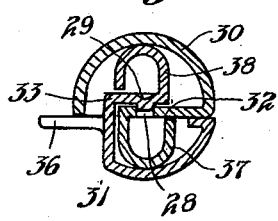
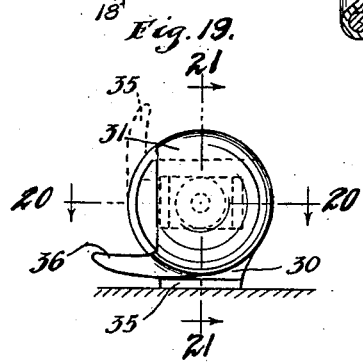
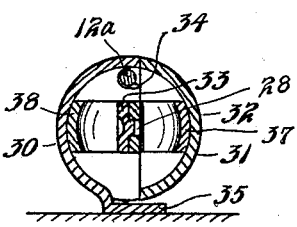
INVENTOR.
FRANK O. ANDERSON.
BY HIS ATTORNEY.
James F. Williamson

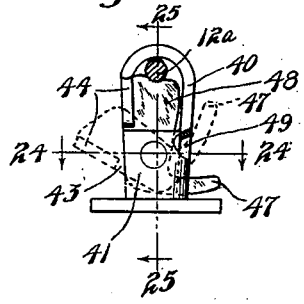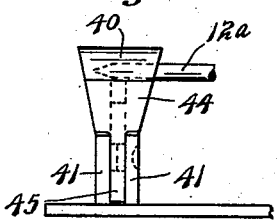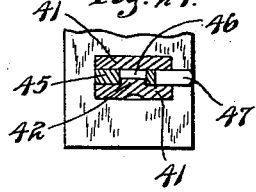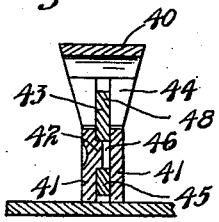

Patented Oct. 14, 1924.

1,511,931

UNITED STATES PATENT OFFICE.

FRANK O. ANDERSON, OF MINNEAPOLIS, MINNESOTA; RUTH V. ANDERSON ADMINISTRATRIX OF SAID FRANK O. ANDERSON, DECEASED.

SAFETY CATCH AND METHOD OF MAKING THE SAME.

Application filed June 28, 1922. Serial No. 571,466.

*To all whom it may concern:*

Be it known that I, FRANK O. ANDERSON, a citizen of the United States, residing at Minneapolis, in the county of Hennepin and State of Minnesota, have invented certain new and useful Improvements in a Safety Catch and Method of Making the Same; and I do hereby declare the following to be a full, clear, and exact description of the invention, such as will enable others skilled in the art to which it appertains to make and use the same.

This invention relates to an article of jewelry and method of making the same, and while it is particularly directed to a safety catch for pins and the method of making the same, it is also applicable to many other pivotally connected articles.

It is an object of this invention to provide a method whereby very small parts of jewelry, such as a safety catch on pins may be quickly and inexpensively made.

It is a further object to provide such a method for making the said articles from sheet metal.

It is a still further object of the invention to pivotally connect two small jewelry parts by forming portions thereon adapted to be folded into overlapping relation and in providing an aperture in one of said portions and an integral projecting pin or teat on the other of said portions which is adapted to be received and held in said aperture when the parts are assembled in said folded relation.

It is more specifically an object of the invention to form a safety catch of two sheet metal blanks, one of which will be bent to comprise a pin receiving recess and the other of which will be pivotally connected thereto to close the recess, the said blanks having laterally projecting lugs which are bent into spaced substantially parallel relation with the bodies of the blanks and are assembled in overlapping relation, one of these lugs having an aperture therein and the other having an integral pressed-up pin or teat received in said aperture.

These and other objects and advantages of the invention will be fully set forth in the following description made in connection with the accompanying drawings in which like reference characters refer to the same parts throughout the different views, and in which—

Fig. 1 is a top plan view of a jewelry pin having the catch applied thereto;

Fig. 2 is a view in side elevation of the pin;

Fig. 3 is a view in end elevation on an enlarged scale of the catch detached from the pin;

Fig. 4 is a view in side elevation of the catch, as seen from the right of Fig. 3;

Fig. 5 is a view in side elevation of one of the parts of the catch;

Fig. 6 is a view in side elevation of the other part of the catch;

Fig. 7 is a horizontal section on the line 7—7 of Fig. 5;

Fig. 8 is a horizontal section on the line 8—8 of Fig. 6;

Fig. 9 is a view of the blank from which one of the parts is formed;

Fig. 10 is a bottom edge view of said blank;

Fig. 11 is a plan view of the blank from which the other part is formed;

Fig. 12 is a bottom edge view of the blank shown in Fig. 11;

Fig. 13 is a horizontal section taken on the line 13—13 of Fig. 4;

Fig. 14 is a view in side elevation of a different type of pin having the catch applied thereto;

Fig. 15 is a view in vertical section on a somewhat enlarged scale, taken on the line 15—15 of Fig. 14;

Fig. 16 is a view on an enlarged scale taken on the line 16—16 of Fig. 14;

Fig. 17 is a view similar to Fig. 14 showing a modification;

Fig. 18 is a vertical section on the line 18—18 of Fig. 17;

Fig. 19 is a view in side elevation of a modified form of the catch;

Fig. 20 is a horizontal section taken on the line 20—20 of Fig. 19;

Fig. 21 is a vertical section taken on the line 21—21 of Fig. 19;

Fig. 22 is a view in side elevation of another modified form of catch;

Fig. 23 is a front elevation of the same;
Fig. 24 is a horizontal section on the line 24—24 of Fig. 22; and
Fig. 25 is a vertical section on line 25—25 of Fig. 22.

Referring to the drawings, a jewelry pin having a body portion 1 is illustrated which has also the pin 2 swingingly mounted and attached to the body 1 adjacent one end thereof. At the other end of the pin is a catch comprising one member 3 which is formed to have a pin receiving recess of curved or other form. In the embodiment of the invention illustrated, this recess is formed by bending the top of the catch over forwardly in a curve. To the member 3 is pivoted the other member 4 of the catch which is adapted to swing to position to close the recess to hold the pin 2 therein and to swing to another position to open the recess whereby the pin may be released. The top of the catch, it will be noted, has a depending end while member 4 is alined flatwise with this end and swings in the plane thereof.

It has been found in practice that it is impractical from a commercial standpoint to pivot the parts 3 and 4 together by a pivot pin in the form of a screw or rivet. Applicant has, therefore, after much labor and experiment, invented the following method.

Blanks 5 and 6, as shown in Figs. 9 and 11 are first cut from thin sheet material capable of being bent into the desired shape. The blank 5 has a laterally projecting lug 7 and the blank 6 has a laterally projecting lug or portion 8, the latter projecting from the respective opposite side of blank 6 from that in which the lug or projection 7 projects. The lug 7 is perforated with a small aperture 10 and the lug 8 is, by means of a punch and die in which it is held, provided with a projecting pin or teat 9. This portion 9 is formed by striking or pressing the opposite side of a blank with a punch to form a depression 11 therein. The metal displaced by the said punch is forced into the die on the other side of the blank to form the projecting portion 9. In the next step, the blanks are bent. The top portion of the blank 5 is of such configuration that when bent over, as shown in Fig. 5, it will form a pin receiving recess and the lower edge thereof will be properly shaped to co-operate with the top edge of the blank 6. The lug 7 is also bent around forwardly, as seen in Figs. 5 and 7 on substantially the line at the left side of the blank, as seen in said figures. The lug 8 of the blank 6 is also bent around rearwardly. These lugs are bent around so that they stand at an angle of substantially 45 degrees with the plane of the main body of the blank. When in this position, the parts are assembled so that the lug 8 overlaps the lug 7 and occupies the space between the same and the body portion of the blank 5. The lug 7 then, of course, occupies the space between the lug 8 and the body portion of the blank 6. The parts are so assembled with the projection 9 alined with the opening 10 and are then bent and pressed together to occupy the position shown in Fig. 13. In this position, the lugs 7 and 8 lie substantially parallel to the main body portion of the blanks 5 and 6 and the resulting four layers of metal are all substantially in contact. The parts are thus held in assembled and pivoted relation and the member 4 can swing about the projection 9 as a pivot. The edge of the overturned top portion of member 3 is formed on the arcs of circles and corresponds with the configuration of the top of the member 4, so that when the parts are in the position shown in Figs. 2 and 4, the said edges are in contact and the member 4 cannot be moved further to the left. In order to open the recess in member 3, the member 4 is revolved to the right. For the purpose of easily manipulating member 4, the same is provided with a finger-piece $4^a$ projecting from the outer side thereof. In the more expensive pieces of jewelry the pin 2 is usually carefully made and mounted so that its pointed end will not project beyond the left hand side or outer portion of the catch. With such a pin, the finger-piece $4^a$ could extend outwardly in the plane of the body of the member 4 and when swung to the position shown in dotted lines in Fig. 2, would not interfere with the entry of the pin into the recess. The present catch, however, can be made sufficiently cheap to be applied to very cheap jewelry. In such jewelry, the length of the pin 2 is not carefully determined. In order that the finger-piece $4^a$ will not lie in the path of the pin 2, the same is offset, as shown in Figs. 8 and 13, and when swung to the dotted line position shown in Fig. 2, the same will be disposed sufficiently to the rear of the catch toward member 3 to permit the complete entry of the pin 2 into the recess of member 3 even if the pin projects quite a distance beyond the catch. As stated, the parts are made from sheet material, preferably sheet metal. In order that the member 4 may be held in its closed position, the same is provided at its top edge with a slight elevation $4^b$ adapted, when the same reaches closed position, to snap into a similarly formed recess $3^b$ formed in the depending overturned edge of member 3. There is sufficient resiliency in the metal to allow the member $4^b$ to move along the edge of the overturned portion of member 3 and when the same comes opposite the recess $3^b$ it will snap into the same. The member 4 will thus not readily be moved from its closed position by contact with any object but can be easily moved by upward pressure applied to the finger-piece.

As stated, it is possible to make the described catch so cheaply that it can be applied to very cheap pins. In Fig. 14, a modification of the catch is shown applied to a pin of the ordinary safety pin type. In this modification, one arm 12 of the pin is extended partially around the closed end thereof and a piece of sheet metal 13 is clamped around the same and formed with an inwardly projecting lug 14, which lug will be provided with a small aperture. The upper portion of the member 13 is bent to form an open channel substantially of U-shape, as seen in the section in Fig. 15. A member 16 is provided which will be substantially of the shape in plan of member 4 already described, except that it will have two portions, each shaped as is the member 4, the second portion taking the place of lug 8. These two portions are connected by a narrow tongue 16ª. This member 16 will be folded with the two sides in substantially parallel relation and one of its sides will be provided with a projection 17 formed in the same manner as is the projection 9. The two sides of the member 16 are folded to embrace the lug 14 and the projection 17 fits in the aperture formed in said lug. The member 16 is thus pivotally connected to the lug 14, and, hence, to the member 13. This member 16 is provided with finger-pieces 18 and in order that these finger pieces may clear the front of the pin, they are bent outwardly, as shown in Fig. 16, and connected at their outer ends in any suitable manner, such as by soldering or a small rivet, as illustrated. The bottom edges of the channel formed at the top of member 13 are shaped similarly to the edge of the overturned portion of member 3 and the top of member 16 is shaped similarly to the top portion of member 4, as clearly shown in Fig. 14. When the member 16 is swung or revolved to the right, the pin portion 12ª of the pin can be removed from the recess or channel in member 13 from either side, as is the case with most common safety pins.

In Figs. 17 and 18, a pin similar to the pin shown in Fig. 14 is illustrated in which the pin 12ª can only be inserted from one side. In this construction, a plate 20 is used corresponding to the plate 13 but instead of having an inwardly projecting lug corresponding to the lug 14, one side 21 of the plate is solid, as shown in Fig. 17. A member 22 is provided corresponding to the member 16 in Figs. 14 and 16, and this member is provided with a lug 23 corresponding to the lug 8 of member 4. This lug 23 is bent around to embrace the side 21, which side is provided with a recess and the lug 23 is provided with a projection 24 similar to projection 17 of member 16, which projection 24 is adapted to be received in the aperture in the side 21. The member 22 is thus pivoted to the member 20 and can be swung to open the recess formed in the top of plate 20, or to close the same and will be provided with an extending finger-piece 25 similar to the finger-piece 4ª or 18.

In the structure shown in Figs. 14 to 17, it will not be necessary to provide a locking device similar to that provided by members 4ᵇ and 3ᵇ. When the members 16 and 22 are swung to their closing positions they will be formed to have frictional engagement with the plates 13 and 20, respectively, so that they will not tend to move from their closed position. It may be here stated that in the top of the catch illustrated, there is no tendency for the closing member to swing open. The goods to which the pin is attached is usually more or less gathered along the pin 2 or the pin 12ª and this goods will press against the upper portion of the closing members 4, 16 and 22 and tend to hold them in their closed position.

It is desired by a great many jewelry manufacturers to have catches made in the shape of balls or spheres and in Figs. 19 to 21, a ball catch constructed according to the present method, is illustrated. In this catch, the member 30 corresponds to the member 3 and the member 31 corresponds to the member 4 and these members are provided with lugs 32 and 33 adapted to be folded into overlapping relation, one of which is provided with an aperture 28 and the other of which is provided with a projection 29 similar to the projection 9. The member 30 which is of somewhat greater extent than a half sphere is provided with a cut-out portion adapted to form a recess 34 which will receive the pin to be held and the member 31 is provided with a finger-piece 36. The member 32 which is of somewhat lesser extent than a half sphere has a segment cut away adjacent the finger-piece 36 so that when the latter is swung to its upper position the recess 34 will be uncovered to allow entry and exit of pin 12ª. The lugs 32 and 33 are each formed with curved lips 37 and 38, respectively. These lips are provided so that when the hole 28 and projection 29 are engaged the parts 32 and 33, as well as parts 30 and 31, can be brought to final closed position by pressure on the exterior of the latter members. When the finger-piece is pressed down to bring the catch to closed position it will bind against the flange 35 on member 30 and the latter will thus form a stop and locking means.

It is thought the operation of this pin will be clear without further description, the part 31 merely swinging relatively to the part 30 to open and close the recess 34. The catch shown in Figs. 18 to 20, as well as that shown in Figs. 1 to 13, is adapted to be soldered onto the pin body. It will be noted from an inspection of Fig. 3 and Fig. 21 that the catches illustrated therein will stand erect on the pin body. This fact greatly facilitates the attaching or soldering operation.

In Figs. 22 to 25 a further modified form of the pin is shown. In this form, a member 40 is used which will be made from a blank cut from a piece of sheet material. The blank will have a portion which is bent around to form a pin receiving recess at the top thereof and will have side portions 41 which are bent into planes substantially at right angles to the main or rear portion of the blank and disposed below the overhung top portion. One of these portions 41 has a projection 42 formed thereon which is similar to the projection 9 on the device shown in Figs. 1 to 13. Another member 43 is used which will, likewise, be formed from a blank of sheet metal having a portion 44 adapted to contact and aline with the sides of the bent-over top of the member 40. The member 43 also has a portion 45 received between the members 41, which portion is provided with a recess 46 and the member 44 is further provided with a finger-piece 47 and with a portion 48 projecting at right angles to the portion 44. The member 40 is formed with a slot 49 in its rear side through which the finger-piece 47 is arranged to project and the sides 41 are then folded on the portion 45 with the projection or teat 42 received in the aperture 46. The part 48 is formed with its top surface inclined and said surface is adapted to contact with the pin 12ª which will be received in the recess formed by the bent-over top of the member 40. It will be seen that the member 43 is thus pivoted to the member 40 and can be swung, as indicated by dotted lines in Fig. 22. When in this full line position, the pin receiving recess will be closed and the pin 12ª will be contracted by the inclined surface of the portion 48 and moved against the overturned top of member 40. There will be a slight resiliency in this overturned portion and as the inclined surface comes to its closed position the friction thereof against the pin will form a locking means for holding the catch in closed position. A compact, simple and neat catch is thus formed.

While the method above described can be carried out by hand with the use of simple instruments and the parts so assembled, in actual practice, the parts will be formed and made by machinery. The machinery has now been perfected for manual operation and it is the purpose of the applicant to continue the improvement of this machinery until the catches can be turned out by an automatic machine.

From the above description it is seen that applicant has provided a simple and very efficient safety catch and has invented a method for making the same by which the article can be made very inexpensively and very rapidly. When the catch is once assembled, it is practically impossible to cause disarrangement of the same. The parts are accurately cut out on dies and the operation of the device mechanically, is practically perfect. It is obvious that the method of pivotally connecting the parts could be used for other purposes than the safety catch and might form an efficient construction for the hinged parts used on many pieces of jewelry. It will be noted that when the catch is closed the sides of the same lie in two planes so that there is a smooth surface, on each side of the catch and all parts of the same lie flush with each other. The finger-piece projects outwardly at the end of the pin where it is always in convenient position to be manipulated. The finger-piece when closed, also lies adjacent the body of the pin where it is protected against accidental movement and it thus swings downwardly to closed position, which is a very desirable feature in such a catch.

It will, of course, be understood that various changes may be made in the form, details, arrangement and proportions of the device and in the steps and succession of steps of the method without departing from the scope of applicant's invention, which, generally stated, consists in the matter shown and described and set forth in the appended claims.

What is claimed is:

1. A hinged device comprising two members mounted for relative swinging movement, one of said members having adjacent substantially parallel portions, one of which has an aperture formed therein and the other of said members having adjacent substantially parallel portions, one of which has an integral projecting teat or pin, said members being disposed in overlapping relation with the said teat or pin in one disposed in the aperture in the other whereby the members are held in swingingly connected relation, the portions parallel to the portions having the teat and aperture forming smooth exteriors.

2. A jewelry device comprising two members, one of which is provided with a pin receiving recess and the other member being formed of sheet material and adapted to close said recess, one of said members having a portion provided with an aperture, the other member having a portion provided with an integral projecting pivot forming pin or teat, said portions being bent and disposed in overlapping relation with the said pin or teat disposed in said aperture whereby the parts are held in assembled swinging relation.

3. A safety catch comprising two members mounted for swinging relation, said members being made of sheet material, one of said members being formed with a bent-over top portion constituting a pin receiving recess, and the other member formed to close this recess, one of said members having an intermediately projecting lug provided with an aperture, the other member having a projecting lug provided with a struck-up pivot-forming projection, said lugs being bent into spaced substantially parallel relation with said members and disposed in overlapping relation with said projection disposed in said aperture, the lug of each member being disposed in the space between the other member and its respective lug, whereby the parts are held in assembled pivoted relation.

4. A device of the class described having in combination, a body portion, a lug secured at one end thereof having a portion forming a pin receiving recess therein said recess having an opening extending therefrom, a member swingingly mounted intermediate its ends at one side of said recess and adapted to swing across said opening to hold the pin in said recess, a pin swingingly secured adjacent to the other end of said body, and adapted to have its end received in said lug, the end of said pivoted member adjacent the pin swinging toward the secured end of the pin when moving to pin releasing position.

5. In a device of the kind described, the combination with a body and a pin swingingly connected thereto, of a pin locking device comprising a lug on said body, said lug in one face having a lateral pin passage, of a turn button pivoted adjacent its center to said lug, provided at one end with a gate forming portion arranged to open and close said lateral pin passage, and provided at the outer edge of its other end with a stop and a finger-piece, said stop being engageable with said body, said lug and the gate forming end of said turn button having co-operating segmental surfaces following an arc struck from the pivot of said turn button and frictionally engageable in a plane of said turn button.

6. In a device of the class described, the combination with a body, of a pin locking device comprising an upstanding lug on said body, said lug having a portion forming a pin receiving recess in one side thereof, a member pivoted intermediate its ends to said lug alined with said portion to swing in the plane thereof, one end of said member constituting a closing gate to close the recess in said lug, and to retain the end of the pin therein, and the other end of said member being formed as a finger-piece for operating said member.

7. In a device of the class described, the combination with a body and a pin pivoted thereto at one end, of a pin locking device comprising an upstanding lug on said body having a portion forming a pin receiving recess in said portion and alined therewith and a member pivoted intermediate its ends to said lug and swinging in the plane of one side thereof arranged to close said recess and having a finger-piece at one end thereof which end is adjacent said body when the said recess is closed.

8. In a device of the class described, the combination with a body, of a pin locking device comprising an upstanding lug on said body, said lug having a pin-receiving opening in one side thereof, of a flat member of sheet material pivoted intermediate its ends to said lug and adapted to close the opening therein, said member having one end forming a stop, which end is adjacent and co-operates with said body when the member is in closing position.

9. In a device of the class described, the combination with a body, of a pin locking device comprising an upstanding lug on said body, and a member pivoted intermediate its ends to said lug on a pivot extending substantially at right angles to the longitudinal axis of said body and adapted to engage and lock with said lug and to close said opening, the closing end of said member swinging toward the pivoted end of the pin when moved to open position.

10. In a device of the class described, the combination with the body and a pin swingably mounted at one end thereof, of a pin-locking device comprising an upstanding lug, the top of which is bent over into substantially semi-circular form to form a pin-receiving opening at one side of said lug, and a member pivoted intermediate its ends to one side of said lug, said member being disposed in vertical alinement with the depending edge of said bent-over top and substantially parallel to said lug and adapted to close the opening therein, the front surface of said member being flush with the front surface of said lug when the member is in closed position whereby the device has smooth vertical sides.

11. A safety catch for a pin having a body and a pin swingingly connected thereto comprising a member upstanding from said body formed with a recess therein to receive the other portion, and a plate-like member pivoted to said member on a pivot extending substantially at right angles to said pin adapted to close said recess, said plate-like member having a projection forming a finger-piece and being so mounted that the finger-piece swings upwardly when the plate-like member moves to open the recess and downward when said plate-like member moves to close said recess.

12. A safety catch for an article having a pin and body movable relatively to each other, comprising, a member projecting from said body and formed with a recess having an opening extending therefrom to receive said pin and a flat member pivoted at one side of said member and at one side of said pin adapted to swing to close and open said opening, and having a finger-piece thereon for swinging the same said flat member moving within the outer surface of said first mentioned member, the outer surface of said members being flush with each other.

13. A safety catch for a pin forming two portions movable relatively to each other comprising a member secured to one of said portions formed with a recess and one open side therein to receive the other portion, and a second plate-like member swingingly mounted and adapted to move in the plane of said open side of said first mentioned member to open and close said recess.

14. In a device of the class described, the combination with a body and a pin swingingly connected to one end thereof, of a pin locking device comprising an upstanding lug on said body having a pin-receiving opening in one side thereof, the longitudinal axis of said opening being substantially parallel to said pin, and a member pivoted intermediate its ends to said lug having flat surfaces substantially parallel to said pin arranged to close said opening and having a finger-piece at one end thereof which end is adjacent said body when said opening is closed.

15. A jewelry device comprising a plurality of members, one of which has a body portion with a pin-receiving recess having an opening extending therefrom and the other of which has a body portion adapted to swing across said opening to close the same, one of said members having a portion with an aperture therethrough and the other member having a portion with an integral lug projecting therefrom, said lug extending into said aperture to form a pivot about which said members relatively swing, said portion with said aperture therein being disposed between said portion with the lug thereon and another substantially parallel portion of the member having the lug carrying portion.

16. A device of the class described comprising a plurality of members, one of which has a pin-receiving recess having an opening extending therefrom through which a pin moves into said recess and another of which has a portion adapted to swing over said opening to hold the pin in said recess, one of said members having a portion with an aperture therein and the other of said members having a portion with an integral lug projecting therefrom and seated in said aperture pivotally to connect said members, one of said portions being disposed between the other of said portions and a substantially parallel part of the member carrying said latter portion.

In testimony whereof I affix my signature.

FRANK O. ANDERSON.